(12) United States Patent
Heidler

(10) Patent No.: US 6,956,370 B2
(45) Date of Patent: Oct. 18, 2005

(54) METHOD FOR REDUCING RINGING IN NMR MEASUREMENTS BY COMBINING NMR SIGNALS HAVING A SPIN ECHO AND SPURIOUS SIGNAL COMPONENT

(75) Inventor: Ralf Heidler, Richmond, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 136 days.

(21) Appl. No.: 10/065,334

(22) Filed: Oct. 4, 2002

(65) Prior Publication Data

US 2004/0066192 A1 Apr. 8, 2004

(51) Int. Cl.[7] ................................................ G01V 3/00
(52) U.S. Cl. ........................................................ 324/303
(58) Field of Search .............................. 324/303, 307, 324/309

(56) References Cited

U.S. PATENT DOCUMENTS

| | | | |
|---|---|---|---|
| 4,438,400 A | 3/1984 | Patt | |
| 5,023,551 A | 6/1991 | Kleinberg et al. | |
| 5,596,274 A | 1/1997 | Sezginer | |
| 5,629,623 A | 5/1997 | Sezginer et al. | |
| 5,712,566 A | 1/1998 | Taicher et al. | |
| 5,914,598 A | 6/1999 | Sezginer et al. | |
| 6,121,774 A * | 9/2000 | Sun et al. ................... | 324/303 |
| 6,204,663 B1 | 3/2001 | Prammer | |
| 6,208,136 B1 | 3/2001 | Smith et al. | |
| 6,232,778 B1 | 5/2001 | Speier et al. | |
| 6,237,404 B1 | 5/2001 | Crary et al. | |
| 6,246,236 B1 | 6/2001 | Poitzsch et al. | |
| 6,255,817 B1 | 7/2001 | Poitzsch et al. | |
| 6,291,995 B1 | 9/2001 | Speier et al. | |
| 6,297,632 B1 | 10/2001 | Speier | |
| 6,326,784 B1 * | 12/2001 | Ganesan et al. ............ | 324/303 |
| 6,366,089 B1 | 4/2002 | Poitzsch et al. | |
| 6,373,248 B1 | 4/2002 | Poitzsch et al. | |
| 6,388,441 B1 | 5/2002 | Chen | |
| 6,392,410 B2 | 5/2002 | Luong et al. | |
| 6,400,149 B1 | 6/2002 | Luong et al. | |
| 6,492,809 B1 | 12/2002 | Speier et al. | |
| 6,518,755 B2 * | 2/2003 | Edwards ..................... | 324/303 |
| 6,518,757 B1 | 2/2003 | Speier | |
| 6,518,758 B1 | 2/2003 | Speier et al. | |
| 6,525,534 B2 * | 2/2003 | Akkurt et al. .............. | 324/303 |
| 6,528,995 B1 | 3/2003 | Speier et al. | |
| 6,531,869 B1 | 3/2003 | Speier et al. | |
| 6,538,438 B1 | 3/2003 | Speier et al. | |
| 6,541,969 B2 * | 4/2003 | Sigal et al. ................. | 324/303 |
| 6,566,874 B1 | 5/2003 | Speier et al. | |
| 6,570,381 B1 * | 5/2003 | Speier et al. ............... | 324/303 |
| 6,583,621 B2 * | 6/2003 | Prammer et al. ........... | 324/303 |

FOREIGN PATENT DOCUMENTS

| | | |
|---|---|---|
| EP | 0967490 | 12/1999 |
| GB | 2368648 | 5/2002 |
| GB | 2389660 | 12/2003 |
| WO | WO98/43064 | 10/1998 |

* cited by examiner

Primary Examiner—Brij Shrivastav
Assistant Examiner—Dixomara Vargas
(74) Attorney, Agent, or Firm—Kevin P. McEnaney; Brigitte L. Echols

(57) ABSTRACT

A method of reducing ringing artifacts in a nuclear magnetic resonance measurement is provided. The method utilizes a new pulse sequence that offers ringing cancellation opportunities as well as compensation for otherwise accumulating spin dynamics errors. Ringing cancellation is accomplished by forming linear combinations of spin echoes induced as a result of the pulse sequence. Because the linear combinations are formed between closely spaced spin echoes (i.e., echoes within the same sequence), the likelihood that the ringing artifact will have changed between measurements is diminished.

45 Claims, 5 Drawing Sheets

METHOD FOR REDUCING RINGING IN NMR MEASUREMENTS BY COMBINING NMR SIGNALS HAVING A SPIN ECHO AND SPURIOUS SIGNAL COMPONENT

BACKGROUND OF INVENTION

The present invention relates generally to a method for measuring nuclear magnetic resonance properties of an earth formation traversed by a borehole, and, more particularly, to a method for reducing ringing artifacts in a nuclear magnetic resonance measurement.

Nuclear magnetic resonance (NMR) measurements taken in a borehole can provide different types of information about a geological formation. In the past, such measurements often were made after the borehole had been drilled. Today, however, it is possible to log NMR measurements while drilling (i.e., logging while drilling or LWD), thus saving time and providing valuable real-time information about the earth formation as drilling progresses. For example, such information can indicate the fractional volume of pore space, the fractional volume of mobile fluid, the total porosity of the formation, etc.

NMR logging tools generally include one or more large permanent magnets or electromagnets for generating a static magnetic field, $B_0$, an antenna placed proximate the formation to be analyzed, and circuitry adapted to conduct a sequence of RF power pulses through the antenna to induce an RF magnetic field, $B_1$, in the formation. The circuitry also includes a receiver adapted to detect signals induced in the antenna as a result of the RF pulse sequence. The induced signals then can be measured and processed to provide the desired information about the properties of the formation.

Typically, NMR logging tools are tuned to detect hydrogen resonance signals (e.g., from either water or hydrocarbons) because hydrogen nuclei are the most abundant and easily detectable. In general, measurements of NMR related phenomena of hydrogen nuclei in the earth formation are performed by allowing some time for the static magnetic field, $B_0$, to polarize the hydrogen nuclei of water and hydrocarbons in a direction substantially parallel to $B_0$, thus creating a nuclear magnetization. The direction of the nuclear magnetization can then be changed by applying a sequence of RF pulses to induce the RF field $B_1$. Commonly, the pulse sequence employed includes a first RF pulse (i.e., the excitation pulse) having a magnitude and duration selected to re-orient the nuclear magnetization by about 90 degrees from the orientation attained as a result of $B_0$ (i.e., the initial transverse magnetization). After a selected time, a train of successive RF pulses is applied (i.e., inversion or refocusing pulses), each of which has a magnitude and a direction selected to re-orient the nuclear spin axes by about 180 degrees from their immediately previous orientations. The frequency of the RF field needed to re-orient the nuclear magnetization (i.e., the Larmor frequency) is related to the amplitude of the static magnetic field $B_0$ by the gyromagnetic ratio y, which is unique to each isotope.

After application of the initial RF pulse (i.e., after the nuclear magnetization is in the plane perpendicular to $B_0$), the nuclear magnetization begins to precess around $B_0$, producing a weak RF signal at the Larmor frequency which is detectable by the antenna. Due to inhomogeneities in the magnetic field $B_0$, the coherence between the individual spins eventually is lost and the nuclear magnetization decays rapidly. The inversion pulses re-create the lost magnetization (i.e., the coherence re-appears), producing signals that can be detected by the antenna. These signals, referred to as "spin echoes," generally are measured during the time interval between successive RF inversion pulses. The rate at which the spin echoes decay (i.e., the rate at which the nuclei irrevocably lose their alignment within the transverse plane) is referred to as the transverse relaxation rate. The time constant of this decay, referred to as the traverse relaxation time $T_2$, is related to the chemical and physical properties of the earth formation. For example, hydrogen nuclei in viscous oils have relatively short relaxation times, whereas hydrogen nuclei in light oils have relatively long relaxation times. Similarly, hydrogen nuclei in free water typically have longer relaxation times than those in bound water (e.g., clay-bound water).

To acquire the NMR data, several known pulse sequences are commonly employed. Such sequences include Carr-Purcell-like sequences, such as the Carr-Purcell-Meiboom-Gill ("CPMG") pulse sequence, which often is used for measuring transverse relaxation times. Advantages of the CPMG pulse sequence include compensation for pulse imperfections and inhomogeneities in both the $B_0$ and $B_1$ magnetic fields, as is well known in the art.

The Carr-Purcell-like sequences, however, do not compensate for all undesirable artifacts appearing in NMR measurements. For example, exciting the antenna with RF power pulses in the presence of a strong static magnetic field causes mechanical excitation of the antenna, which leads to generation of a spurious signal in the antenna called "ringing." The ringing signal is unrelated to the NMR phenomena and typically has a large amplitude and slow rate of decay relative to the induced spin echo signals. Because the spin echoes typically are measured shortly after application of an RF pulse, the ringing signals often overwhelm the spin echo signals, resulting in loss of significant information regarding the formation properties.

Several different techniques are known for reducing ringing. One technique has been to design the hardware to minimize the interaction between the electromagnetic fields and the materials of the hardware. An example of such hardware is described in U.S. Pat. No. 5,712,566 issued to Taicher et al.

Another technique, known as "phase alternating pairs" or PAPs, includes creating a phase difference between the ringing signal and the spin echo signals, and summing or "stacking" multiple echo sequences to reduce the amplitude of the ringing signal in the final output. For example, to compensate the ringing of the 180 degree pulses in a particular pulse sequence, the sequence may be repeated twice with opposing directions of the initial 90 degree pulse. By stacking the two sets of echo measurements, the ringing contribution of the 180 degree pulses can be substantially canceled. The ringing of the 90 degree pulse, on the other hand, is not canceled. However, because the 90 degree pulse is only applied once at the beginning of each sequence, its influence dies down relatively quickly and thus affects only early spin echo signals. Examples of ringing cancellation methods utilizing PAPs are described in U.S. Pat. No. 5,596,274 issued to Sezginer and U.S. Pat. No. 5,023,551 issued to Kleinberg et al., and International Publication No. WO 98/43064 by Numar Corp.

A necessary assumption underlying the phase alternated pair ringing cancellation technique is that the ringing does not change between the two measurement sequences. However, in borehole logging applications, the logging tool is moving continuously as the NMR measurements are being made. It has been found in such applications that movement and, in particular, bending of the tool changes the characteristic of the ringing signal between consecutive measurements. Because the two measurements forming a phase alternating pair are separated by a wait time of typically a few seconds, the orientation of the tool in the borehole during a first sequence bears no relationship to the orientation of the tool during the successive sequence. Thus, the phase alternating pair cancellation technique may not result in complete cancellation of the ringing signal in such applications.

Accordingly, it would be desirable to provide a new pulse sequence and a method of processing the spin echo signals resulting from the new pulse sequence to cancel the ringing.

SUMMARY OF INVENTION

A method of reducing a ringing artifact in an NMR measurement is provided. In accordance with one aspect of the invention, the method comprises inducing a static magnetic field in a volume, inducing an RF magnetic field in the volume in accordance with a pulse sequence, and acquiring a sequence of signals generated in the volume in response to the pulse sequence. Each signal in the acquired sequence includes a spurious signal component and a spin echo component. At least a first signal and a second signal of the acquired sequence are combined, thereby generating a corrected signal having a reduced spurious signal component.

In accordance with another aspect of the invention, a method of reducing a ringing signal generated while measuring a nuclear magnetic resonance property of an earth formation adjacent a borehole is provided. The method comprises inserting a logging tool into the borehole, applying a static magnetic field to polarize spins within a volume of the formation, and applying an RF magnetic field to the volume in accordance with a pulse sequence having a plurality of pulses. After each of the plurality of pulses, spin echoes induced in the volume are acquired, thereby forming a measurement set comprising a plurality of spin echo signals, each of which includes a ringing component. The spin echo signals within the measurement set are combined to reduce the ringing components, thereby generating a corrected measurement set.

In accordance with yet another aspect of the invention, a method for determining an earth formation property from NMR measurements is provided. The method comprises acquiring a first measurement set of spin echo signals induced in the earth formation by a first RF pulse sequence, the spin echo signals including a spin echo component and a noise component. The spin echo signals are linearly combined to reduce the noise component, resulting in a first corrected measurement set. An NMR parameter is determined based on the first corrected measurement set, and the earth formation property then is derived from the NMR parameter.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF DRAWINGS

For a more complete understanding of the present invention, reference is now made to the following descriptions taken in conjunction with the accompanying drawing, in which.

DETAILED DESCRIPTION

Figure 1:
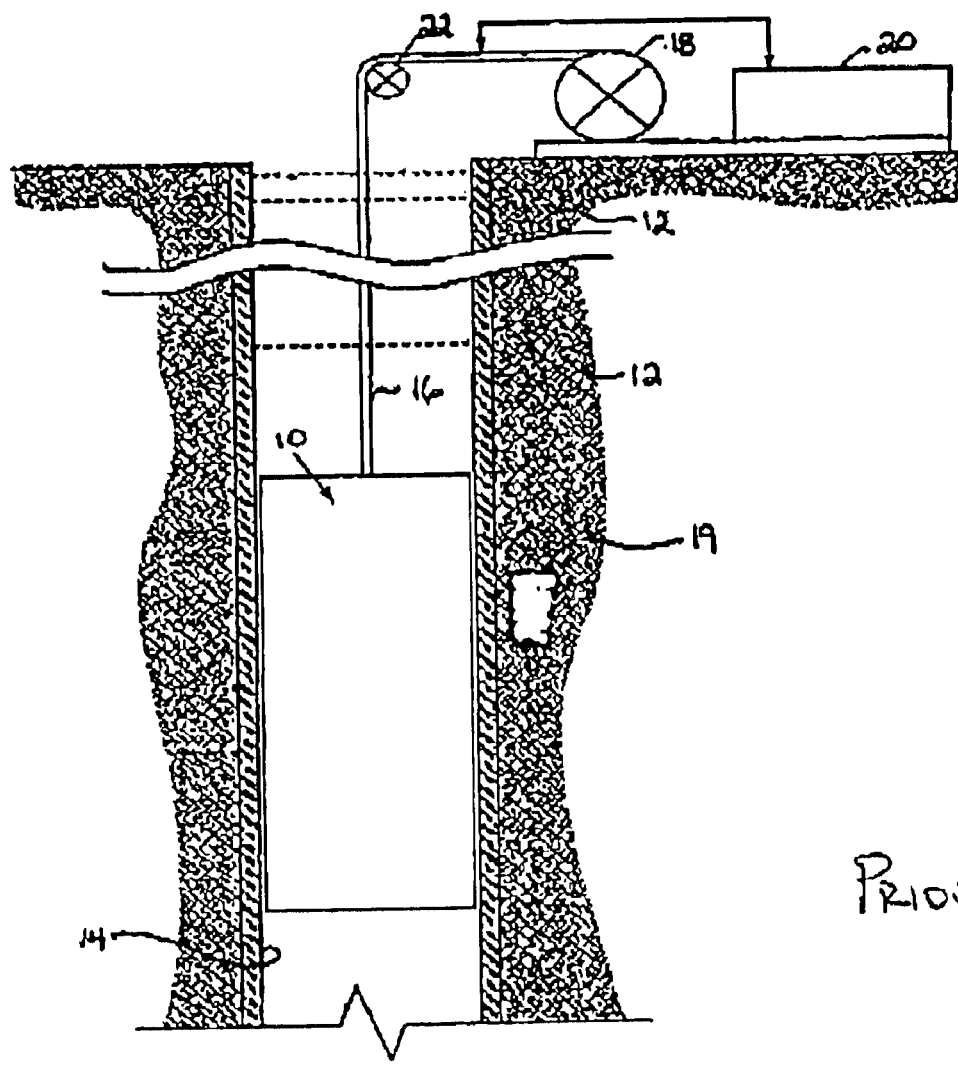
FIG. 1 is a diagram of a typical setup for well logging.

FIG. 1 illustrates a schematic of an exemplary nuclear magnetic resonance (NMR) well logging tool 10 for investigating one or more earth formations 12 traversed by a borehole 14. The logging tool 10 typically is suspended in the borehole 14 on an armored cable 16, the length of which substantially determines the relative depth of the logging tool 10. The cable length is controlled by any suitable means, such as a drum and winch arrangement 18 at the surface.

The NMR logging tool 10 can be any suitable downhole NMR logging device adapted for either wireline logging applications or logging-while-drilling (LWD) applications. As previously discussed, the logging tool 10 typically includes a permanent magnet, an electromagnet, or a magnet array for generating a static magnetic field $B_0$ in a volume of interest 19 in the formations, one or more RF antennae (e.g., solenoid antennae, loop antennae, saddle antennae, etc.), and circuitry configured to produce pulses of RF power to induce the RF magnetic field $B_1$ in the formations and receive the spin echoes detected from the formations.

A surface recording system 20 provides electrical power to the logging tool 10, and signals detected by the tool 10 are returned to system 20 for recording and interpretation via the armored cable 16. Typically, the surface recording system 20 maintains a log of the detected spin echoes with respect to the depth of the logging tool 10. In the embodiment illustrated, output signals representative of depth are provided by a cable length measuring encoder 22. Alternatively, the surface recording system 20 may maintain a log of the detected spin echoes with respect to time. Later, the time-based measurements may be correlated with a log of depth measurements such that depth-based measurements may be derived.

Figure 2:
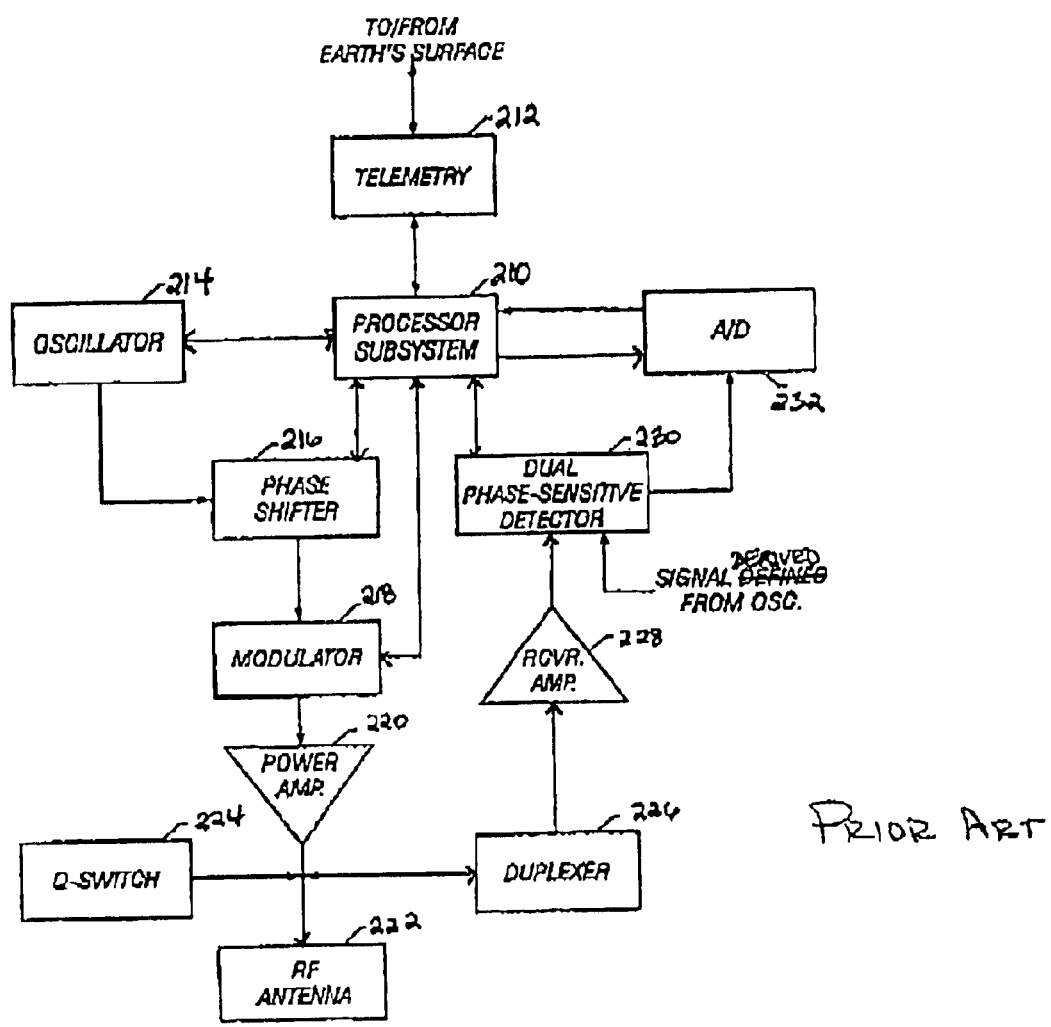
FIG. 2 is a block diagram of an exemplary embodiment of circuitry for producing RF pulses and receiving the spin echoes.

FIG. 2 illustrates, in block diagram form, an exemplary embodiment of downhole circuitry associated with the logging tool 10 that is configured to produce the RF pulses and detect the spin echoes. In general, the circuitry generates an RF signal which is transmitted through an antenna to induce an RF magnetic field in the earth formations. Spin echo signals generated as a result of the RF magnetic field are detected by the antenna and either are stored or transmitted back to the earth's surface for logging by the surface recorder system 20. One skilled in the art would appreciate that various embodiments of the circuitry may be used without departing from the scope of the invention.

As shown in the exemplary embodiment of FIG. 2, the downhole circuitry includes a processor subsystem 210 having associated memory, timing circuitry, interfaces, and selected peripheral devices (not separately shown). The processor subsystem 210 is coupled with a telemetry circuitry 212, which communicates with the surface recording system 20.

The pulse forming circuitry includes a variable frequency oscillator 214 which, under control of the processor subsystem 210, generates an alternating RF signal at the desired frequency. The output of the oscillator 214 is coupled to a phase shifter 216 (which provides for control of pulse phases) and a modulator 218, both of which are under control of the processor subsystem 210 to produce the desired pulse phases of the RF field. The output of the modulator 218 is coupled, via a power amplifier 220, to an RF antenna 222. A Q-switch 224 optionally can be provided to damp the RF antenna system to reduce antenna ringing.

In the embodiment illustrated, the antenna 222 both transmits the RF pulses to induce the RF field in the formations and detects the echo signals resulting from application of the RF field. Thus, as shown in FIG. 2, the antenna 222 also is coupled with a receiver section through a duplexer or switch 226, the output of which is coupled with a receiver amplifier 228. During transmitting and damping modes, the switch 226 protects the receiver amplifier 228 from the high power pulses which pass to the RF antenna 222. During the receiving mode, the duplexer 226 acts as a low impedance connection from the antenna 222 to the receiver amplifier 228. The output of the receiver amplifier 228 is coupled with a dual phase-sensitive detector 230, which also receives, as a reference, a signal derived from the oscillator signal. The output of the detector 230 is coupled to an analog-to-digital converter 232, the output of which is a digital signal representative of the detected NMR signals.

1It should be understood that although the logging tool 10 is shown as an integral or unitary device in FIG. 1, it may alternatively comprise separate components and may be combinable with other logging tools. Further, while a wireline tool is illustrated in FIG. 1, alternative forms of physical support and a communicating link with the surface can be used, for example, in an LWD application. Still further, the digital signals representative of the detected spin echoes may be transmitted to the surface recording system 20 while the tool 10 is downhole. The transmitted signals may be either the received raw measurements or the relevant NMR parameters computed using downhole processing. Alternatively, the digital signals may be stored in memory by the processor subsystem 210 and later retrieved when the tool 10 has returned to the surface.

Using the logging tool 10, several NMR parameters can be measured from which formation properties may be derived. For example, most NMR logging instruments are configured to measure the spin-lattice (longitudinal) relaxation times ($T_1$) and/or spin-spin (transverse) relaxation times ($T_2$) of hydrogen nuclei. Such measurements may be acquired by first polarizing the nuclei by exposure to a static magnetic field $B_0$ and then applying an RF pulse (the excitation pulse) tuned at the Larmor frequency of the nuclei of interest and calibrated in length to achieve a 90 degree rotation of the spin magnetization.

The following discussion is made with reference to a rotating frame in which the $B_0$ field and the $B_1$ field are constant. The rotating frame is defined such that its z-axis is parallel to $B_0$ and its x-axis is parallel to $B_1$ during the initial 90 degree pulse. Further, the following discussion is made with reference to FIG. 3, which generally illustrates a sequence of pulses that may be used to measure NMR properties.

Figure 3:
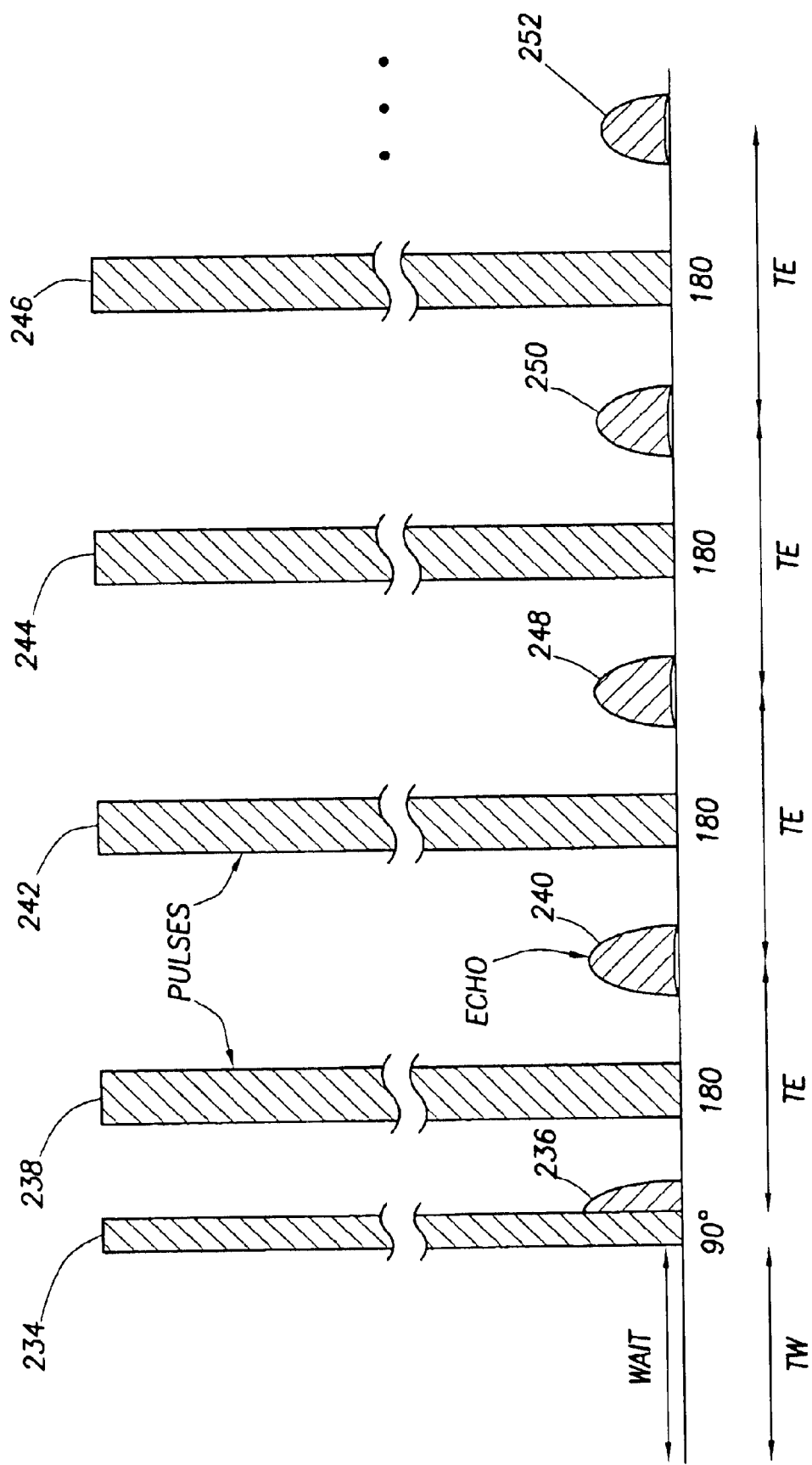
FIG. 3 generally illustrates a typical pulse sequence which includes an excitation pulse and multiple inversion pulses.

As shown in FIG. 3, there typically is a wait time $T_W$ (e.g., 2–3 seconds) before application of a 90 degree excitation pulse 234. Immediately after the excitation pulse 234, the magnetization of the nuclei is aligned with the y-axis of the rotating frame. The magnetization then decays rapidly, primarily due to unavoidable inhomogeneities of the magnetic field. This rapidly decaying signal is called the free induction decay, or FID, and is represented in FIG. 3 by the signal 236. The FID typically is not detectable by well-logging tools because of its fast decay and the ringing generated in the antenna as a result of the 90 degree pulse.

The signal can be re-created, however, by applying a 180 degree (i.e., inversion) pulse, such as the pulse 238 in FIG. 3, which causes the de-phased spins to regain phase coherence, thus forming a spin echo (e.g., signal 240). This process of echo formation by application of a 180 degree pulse can be repeated hundreds of times (i.e., a pulse sequence) to induce a corresponding sequence of spin echoes. In FIG. 3, the pulse sequence includes inversion pulses 238, 242, 244, 246, and so forth, and the corresponding spin echo sequence includes signals 240, 248, 250, 252, and so forth. Measurements of the spin echo signals 240, 248, 250, and 252 are performed at intervals of $t_e$, which typically is in the range of 0.5 to 1.5 milliseconds.

One well-known pulse sequence is the Carr-Purcell (CP) sequence, which can be symbolized by the following equation:

$$+X_1(-y_1)+X_2(+y_2)+X_3(-y_3)+X_4(+y_4) \tag{1}$$

wherein the terms in parentheses denote the direction of echo formation, and the bold uppercase terms represent the direction in the rotating frame of the 180 degree inversion pulses. Thus, it can be seen from the foregoing equation that the transverse magnetization of the nuclei is inverted by each 180 degree pulse, resulting in spin echo signals formed in an alternating manner along the +y and y direction of the rotating frame. Although the initial 90 degree pulse is not set forth in the foregoing equation, it is assumed that the pulse is parallel to the x-axis of the rotating frame and produces a free induction decay signal aligned with the y-axis.

The amplitudes of the spin echoes decay with a characteristic decay time $T_2$, which theoretically could be measured with the CP pulse sequence. However, spin dynamics errors due to off-resonance effects and pulse imperfections resulting from unavoidable inhomogeneities in the static magnetic field $B_0$ and the RF magnetic field $B_1$ accumulate during the CP pulse sequence, resulting in a rapid signal decay unrelated to $T_2$. Consequently, it is not practically possible to measure $T_2$ using the CP pulse sequence.

At least two alternative pulse sequences are known which can compensate for these otherwise accumulating effects. The first such sequence is a CP pulse sequence with alternating pulses (designated for the purposes of this disclosure as CPAP), which is represented by the following equation (again, the excitation pulse is not represented):

$$+X_1(-y_1)+X_2(+y_2)+X_3(-y_3)-X_4(+y_4) \qquad (2)$$

In the CPAP sequence, the phase of the inversion pulses is reversed from one pulse to the next, thus providing compensation for spin dynamics errors. Accordingly, the otherwise rapid decay is substantially eliminated, enabling measurement of $T_2$.

The second such alternative sequence is the well-known and commonly used Carr-Purcell-Meiboom-Gill (CPMG) pulse sequence, which is represented by the following equation:

$$+Y_1(+y_1)+Y_2(+y_2)+Y_3(+y_3)+Y_4(+y_4) \qquad (3)$$

In the CPMG sequence represented by equation (3), a 90 degree phase shift (not shown) is inserted between the 90 degree excitation pulse (not shown) and the train of inversion pulses. Consequently, the inversion pulses all are either parallel or antiparallel to the transverse magnetization, and all spin echoes form along the same axis, thus compensating for otherwise accumulating spin dynamics errors.

In the CP sequence represented by equation (1) above, consecutive spin echoes have alternating phases (i.e., alignment in the rotating frame), while all of the inversion pulses have the same phase. Thus, the relative phase between each spin echo and its preceding inversion pulse alternates between consecutive pulses. Consequently, because the phase of the ringing artifacts corresponds to the phase of the associated inversion pulse, the ringing artifacts can be canceled simply by combining spin echo signals within the sequence (assuming the ringing signal does not change between pulses which are separated by a time delay of the order of milliseconds).

In the CPAP sequence represented by equation (2), both consecutive echoes and consecutive inversion pulses have alternating phases. Consequently, in the CPAP sequence, the relative phase between each spin echo and its preceding inversion pulse is constant. Similarly, in the CPMG sequence represented by equation (3), all inversion pulses have the same phase and produce spin echoes having the same phase, resulting in a constant relative phase between each spin echo and its preceding inversion pulse. Accordingly, for both CPAP and CPMG sequences, ringing artifacts can be canceled only by applying two pulse sequences having excitation pulses with opposing phases and then combining or stacking the two resultant echo sequences (assuming that the ringing does not change between consecutive sequences which are separated by a wait time on the order of seconds).

Although inter-sequence echoes resulting from the CP sequence can be linearly combined to cancel the ringing artifacts, an accurate measurement of $T_2$ cannot be made because of the accumulating errors due to magnetic field inhomogeneities. And, although two pulse sequences resulting from CPAP and CPMG measurements can be stacked to cancel ringing, the assumption that ringing does not change between consecutive sequences may not hold true in certain logging applications (e.g., LWD applications) due to the relatively long wait time (e.g., seconds) between measurements.

In particular, in many downhole NMR applications, the orientation of the logging tool is continuously changing as the measurements are being made. For example, in an LWD application, the tool is rotating while measurements are made and thus may be facing different formations having different characteristics resulting in different influences on the ringing signal. Further, the logging tool may bend during the logging operation, which also has been found to change the characteristics of the ringing signals. Accordingly, in practice, NMR measurements derived from stacked PAPs made using the CPAP and CPMG sequences still may include significant ringing artifacts.

The various weaknesses inherent in utilization of the CP, CPAP, and CPMG sequences to cancel ringing in downhole NMR applications may be overcome by use of a new "anti-ringing" pulse sequence and inversion algorithm that minimize the possibility that tool orientation has changed significantly between measurements, while also providing compensation for accumulating errors due to magnetic field inhomogeneities. Thus, such an anti-ringing sequence preferably would offer the advantages of the CP sequence (i.e., the ability to linearly combine echoes closely spaced in time (e.g., milliseconds) to cancel ringing), which could be accomplished by inclusion of either phase alternating inversion pulses or phase alternating spin echoes. It would further be desirable if the ringing cancellation properties of the anti-ringing sequence could be combined with the advantages of the CPAP/CPMG sequences (i.e., compensation for spin dynamics errors).

An anti-ringing pulse sequence that provides both substantial ringing cancellation and spin dynamics compensation is represented by the following equation (in which the excitation pulse is not shown):

$$+X_1(-y_1)-X_2(+y_2)-X_3(-y_3)-X_4(+y_4)+X_5(-y_5)+X_6(+y_6) \qquad (4)$$

This sequence is a repeating pattern of three inversion pulses in the +x direction and three inversion pulses in the x direction. To compensate for spin dynamics effects, the sequence incorporates a phase alternation (i.e., $X_2$) after the first echo (i.e., $y_1$) The phase alternation is followed by two more inversion pulses in the x direction and two inversion pulses in the +x direction. Accordingly, this sequence is referred to as a six-cycle sequence (i.e., the phase pattern of the inversion pulses repeats every six pulses).

Figure 4:
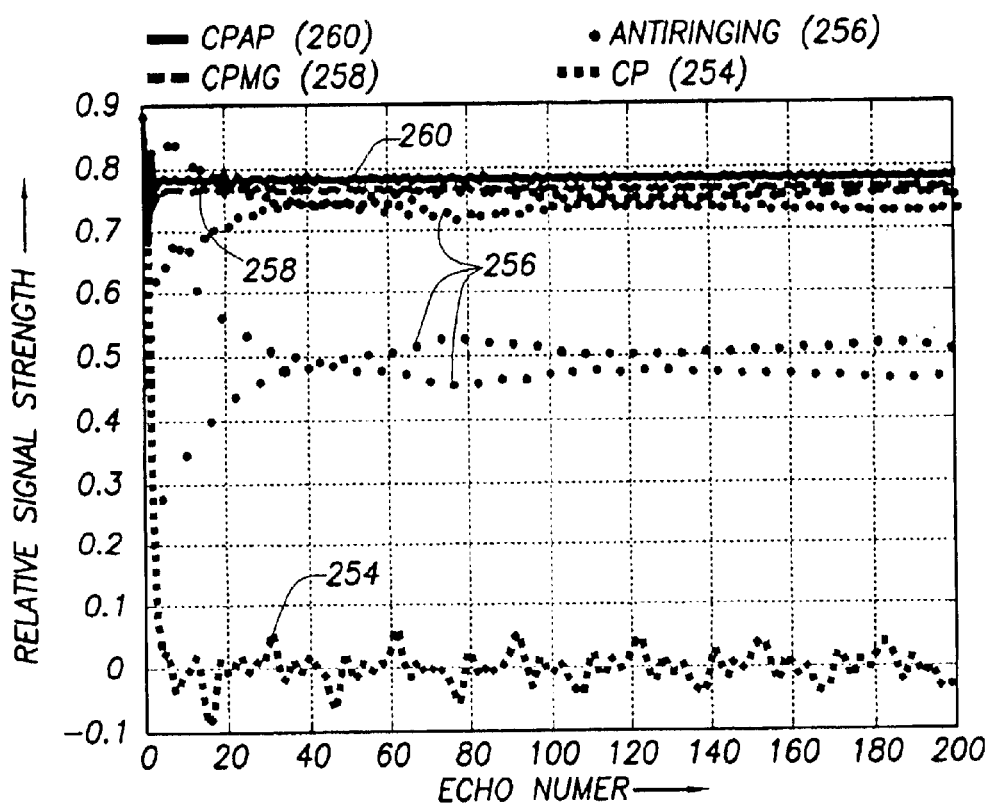
FIG. 4 is a graph illustrating simulated data resulting from application of each of the CP, CPAP, CPMG, and anti-ringing pulse sequences.
Figure 5:
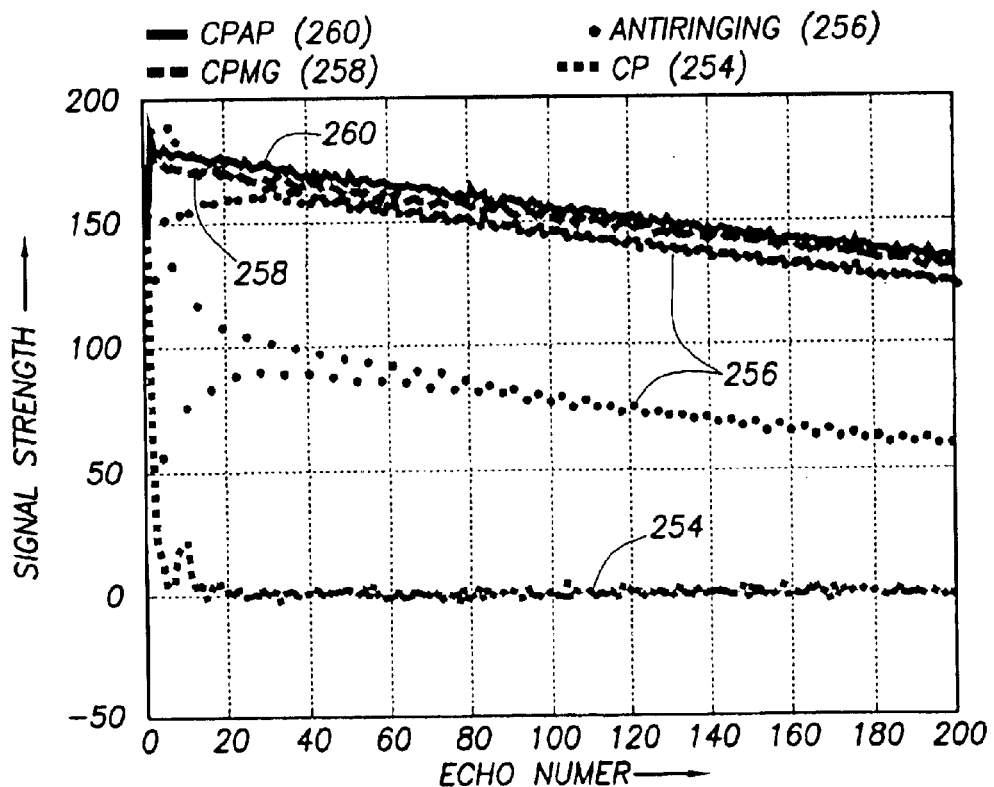
FIG. 5 is a graph illustrating actual data acquired as a result of application of each of the CP, CPAP, CPMG, and anti-ringing pulse sequences.

FIGS. 4 and 5 are graphs of data points resulting from application of the CP, CPAP, CPMG, and the anti-ringing sequence in equation (4). FIG. 4 represents the first two hundred spin echo signals derived from a simulation. FIG. 5 illustrates the first two hundred spin echo signals acquired in a laboratory experiment with an inter-echo spacing of 1.2 msec. Both graphs illustrate and compare the capability of each pulse sequence to compensate for spin dynamics effects. For example, it can be seen from FIGS. 4 and 5 that the signal resulting from the CP sequence (254) decays quickly due to accumulating off-resonance and field inhomogeneity effects, thus rendering measurement of $T_2$ practically impossible. In contrast, the new anti-ringing sequence (256) performs almost as well as the CPMG (258) and CPAP (260) sequences for two out of every three echo signals. As can be seen in FIGS. 4 and 5, every third echo signal induced by the anti-ringing sequence is weaker by a factor of approximately 0.6.

With respect to the anti-ringing pulse sequence represented by equation (4), cancellation of inversion pulse ringing can be performed by linearly combining and averaging nearby echoes (i.e., echoes that are separated by a relatively short time $t_e$) in the same sequence. In one exemplary embodiment, the time separation $t_e$ between combined echoes is in the range of 2–3 milliseconds. However, the time separation may be shorter or longer than 2–3 milliseconds as the goal of using closely spaced echoes simply is to reduce the possibility that the position of the logging tool has changed significantly between measurements and thus has altered the ringing component of the acquired echo signals.

For the foregoing sequence, several different linear combinations of the echo signals result in ringing cancellation. For example, at least the following four different linear combinations yield results adequate to obtain measurements of the $T_2$ distribution:

$$(a)\, lc_1 = \tfrac{1}{2}(e_i + e_j)\, \forall i = 1, 4, 7, \ldots, j = 3, 6, 9, \ldots$$

$$(b)\, lc_2 = \tfrac{1}{2}(e_i + e_j)\, \forall i = 2, 5, 8, \ldots, j = 3, 6, 9, \ldots$$

$$(c)\, lc_3 = \tfrac{1}{2}(e_i + e_j)\, \forall i = 3, 6, 9, \ldots, j = 4, 7, 10, \ldots$$

$$(d)\, lc_4 = \tfrac{1}{2}(e_i + e_j)\, \forall i = 3, 6, 9, \ldots, j = 5, 8, 11, \ldots$$

where lc represents the linear combination, and e represents the individual echo signals.

Thus, by using the linear combinations, the anti-ringing pulse sequence represented by equation (4) can result in reduction of ringing contributions that arise from changes in antenna orientation (e.g., bending, direction) without the need to take a second measurement to form a phase alternating pair. This ringing reduction technique is particularly advantageous in an LWD application, because ringing cancellation calculations are performed by combining and averaging echoes that are separated in time by only a few milliseconds. Thus, the opportunity for the orientation of the logging tool to change significantly is minimized. For example, in a typical logging application, the logging tool moves at approximately 120 r.p.m. Consequently, the tool will move only approximately 2 to 3 degrees between cancellation echoes that have a time separation of 2–3 msec. In contrast, if phase alternating pairs are formed to cancel ringing, the cancellation echoes will be acquired several seconds apart, practically assuring that the orientation of the logging tool (and thus the ringing contribution) will have changed significantly between measurements.

Although the formation of phase alternating pairs is not necessary to obtain ringing reduction, PAPs may be used in combination with the ringing reduction opportunity afforded by the new pulse sequence. Indeed, combining the two ringing reduction techniques may be particularly desirable, because the new echo cancellation technique will reduce ringing contributions influenced by movement of the logging tool, while formation of PAPs will reduce those ringing contributions that are independent of tool orientation and/or that change slowly from echo to echo.

Other sequences that provide for both ringing reduction via linear combination of closely spaced echoes within a single sequence and spin dynamics compensation also are contemplated. For example, $$+Y_1(+y_1) - Y_2(+y_2) - Y_3(+y_3) \qquad (5)$$

and $$+Y_1(+y_1) + Y_2(+y_2) - Y_3(+y_3) \qquad (6)$$

both are three-cycle sequences which compensate for spin dynamics errors and allow for linear combination of echoes (note: the excitation pulses are not shown). For example, in equation (5), echo 1 may be combined with echo 2 and echo 3. In equation (6), echo 3 may be combined with echo 1 and echo 2 to cancel ringing. In both sequences, phase alternation of at least one of the inversion pulses provides compensation for otherwise accumulating spin dynamics errors.

Another exemplary sequence is set forth in equation (7):

$$+X_1(-y_1) + Y_2(-y_2) + X_3(+y_3) + X_4(-y_4) + Y_5(-y_5) + X_6(+y_6) \qquad (7)$$

Equation (7) is a six-cycle sequence (note: the excitation pulse is not shown) which generally is similar to a CP sequence with Y inversion pulses (i.e., pulses 2 and 5) interspersed to compensate for spin dynamics errors. Useful linear combinations to cancel ringing include combinations of echo 1 and echo 3, echo 1 and echo 6, echo 3 and echo 4, and echo 4 and echo 6.

Yet another exemplary sequence is set forth in equation (8):

$$+Y_1(+y_1) - Y_2(+y_2) - Y_3(+y_3) + Y_4(+y_4) + Y_5(+y_5) + Y_6(+y_6) \qquad (8)$$

Equation (8) is a six-cycle sequence (excitation pulse is not shown) which appears similar to a CPMG sequence and thus provides compensation for spin dynamics errors. Ringing cancellation is provided by the inclusion of inversion pulses $Y_2$ and $Y_3$ which are directed along the y-axis in the rotating frame. Thus, each of echoes $y_2$ and $y_3$ may be linearly combined with each of echoes $y_1$, $y_4$, $y_5$, and $y_6$ to cancel ringing.

As can be seen from equations (4)–(8) above, not all combinations of inter-sequence echoes will have an effect on ringing cancellation. That is, either the echoes should be oppositely phased or the associated inversion pulses should be oppositely phased if the combination is to have an effect on ringing cancellation. Accordingly, to optimally use the ringing cancellation feature offered by the pulse sequences represented by equations (4)–(8) above, only those linear combinations of echoes that contribute to ringing cancellation may be used to derive the NMR characteristic of interest (e.g., $T_2$ distribution). It should be understood, however, that other linear combinations other than those that cancel ringing also may used in the inversion algorithms. In such a case, the information of interest still may be derived, although the results may not be as sensitive.

Figure 6:
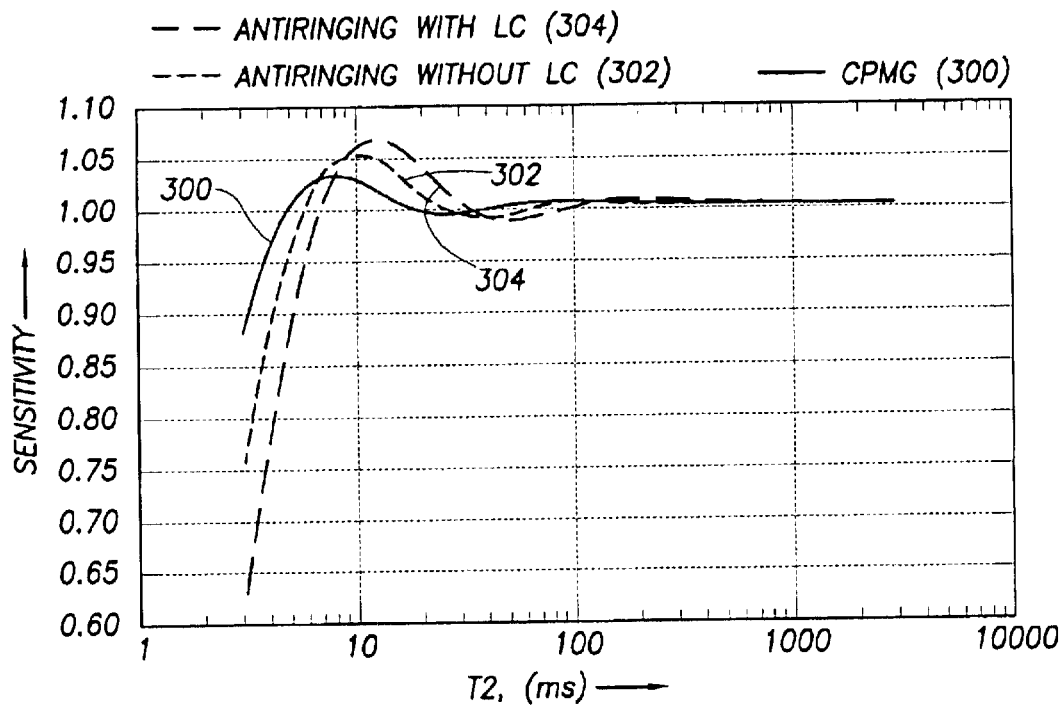
FIG. 6 is a graph illustrating sensitivity curves comparing porosity estimations derived from CPMG measurements and from two different applications of the anti-ringing measurement technique disclosed herein.

For example, FIG. 6 illustrates sensitivity curves 300, 302, and 304 for a porosity estimation derived from different types of measurements. The curve 300 represents the sensitivity curve using spin echo measurements obtained from a CPMG sequence. The curves 302 and 304 represent sensitivity curves using linear combinations of spin echoes as described above. In deriving curve 302, linear combinations with and without ringing cancellation were used. In contrast, in deriving curve 304, only those linear combinations that contribute to ringing cancellation were allowed. As can be seen from FIG. 6, deriving the solution from CPMG measurements provides the best results, and restricting the solution to using only ringing canceling linear combinations provides only slightly worse results than not imposing the restriction.

The effect of using linear combinations of echoes on a $T_2$ inversion algorithm is illustrated by the following discussion. When deriving $T_2$, the inversion algorithm attempts to solve the following system of linear equations:

$$\vec{e} = M \vec{a} \qquad (9)$$

where $\vec{e}$ represents the measured echoes, and $\vec{a}$ represents the sought $T_2$ distribution.

The matrix M in equation (9) is defined as:

$$M_{ij} = \exp\left(-\frac{2t_e}{T_{2j}}\right)\left(1.0 - \exp\left(-\frac{t_w}{f(T_{2j})}\right)\right) \quad (10)$$

where $t_e$ is the inter echo spacing, $t_w$ is the wait time, and $T_{2j}$ for all $j=1, \ldots, N_{T2}$ represents the $NT_2$ bin values logarithmically sampling the interesting $T_2$ range.

The second factor set forth in equation (10) describes the polarization correction, where the function $f(T_{2j})=T_{1j}$ describes the longitudinal relaxation time $T_1$ corresponding to the respective $T_2$.

Equation (9) can be solved by a constrained minimization of:

$$F(\vec{a}) = \|M\vec{a} - \vec{e}\|^2 + \lambda\|\vec{a}\|^2 \quad (11)$$

where a regularization term with the regularization $\lambda$ is added.

To force the $T_2$ inversion algorithm to use the linear combinations of echoes instead of the raw echo measurements, a matrix X may be introduced, which describes the linear combinations of echoes and the spin dynamics correction factors. As a result, equation (9) may be rewritten as follows:

$$X\vec{e} = XM\vec{a} \quad (12)$$

and the cost function represented by equation (11) is rewritten as follows:

$$F(\vec{a}) = \|X(M\vec{a} - \vec{e})\|^2 + \lambda\|\vec{a}\|^2 \quad (13)$$

with the following unconstrained solution:

$$\vec{a} = (M^T X^T X M + \lambda I)^{-1} M^T X^T X \vec{e} \quad (14)$$

Based on this solution for the $T_2$ distribution, characteristics of the earth formation may be derived. For example, the porosity $\phi$ of the earth formation can be computed as the sum of all elements of $\vec{a}$ This computation is represented by the following equation:

$$\phi = \vec{1}\vec{a} = \vec{1}(M^T X^T X M + \lambda I)^{-1} M^T X^T X \vec{e} = \vec{l}^T \vec{e} \quad (15)$$

where $\vec{1}$ $=(1, 1, 1, \ldots)$ is a row vector of "1" and the linear estimator $\vec{l}$ The standard deviation of the thus computed porosity estimator is the standard deviation of the product of the individual echoes and the $L_2$ norm of $\vec{l}$ The response $\vec{s}$ of the porosity estimator with respect to $T_2$ then can be computed as follows:

$$\vec{s} = +e, rar + ee^T M \quad (16)$$

The foregoing example described a processing method which is optimal in the least squares sense. However, for some applications, it may be desirable to compute corrected echoes from the measured echoes that mimic CPMG echoes. If the corrected echoes mimic CPMG echoes, then commonly used inversion algorithms may be used to derive the desired NMR parameter, which could facilitate data delivery as well as interpretation of the data.

Corrected, or CPMG-like, echoes may be computed from the linear combinations of echoes. The linear combinations are computed from the measured echoes as follows:

$$\vec{l} = X\vec{e} \quad (17)$$

where $\vec{e}$ are the measure echoes.

The formal solution for reconstructed echoes $\vec{e}_R$ is:

$$\vec{e}_R = (X^T X)^{-1} X^T = (X^T X)^{-1} X e \quad (18)$$

However, this solution is problematic because the formation of linear combinations destroys some information (e.g., the ringing) which cannot be reconstructed from the linear combinations alone without making further assumptions. This solution also is problematic because it does not apply correction factors for spin dynamics. To apply the spin dynamics corrections without disturbing the ringing canceling properties of the linear combinations, the spin dynamics corrections must be applied to the linear combination rather than to the raw echo measurements. To accomplish this result, the linear combination formation matrix X in equation (18) may be replaced with the matrix $X_{SD}$ that includes the appropriate corrections. Thus, $$\vec{e}_R = (X^T X)^{-1} X^T X_{SD} \vec{e} \quad (19)$$

To reconstruct the echoes from the linear combinations alone, additional information must be supplied. Considering that the linear combinations cancel ringing, then the same linear combinations may be computed except that the echoes are subtracted instead of added. Thus, for example, the following combinations may be performed to reconstruct the echoes from the pulse sequence set forth in equation (4) above:

$$lc_1 = \frac{1}{2}(e_i - e_j) \forall i = 1, 4, 7, \ldots, j = 3, 6, 9 \ldots \quad (a)$$

-continued $$\tilde{I}_{C2} = \frac{1}{2}(e_i - e_j) \forall i = 2, 5, 8, \ldots, j = 3, 6, 9, \ldots \quad (b)$$

$$\tilde{I}_{C3} = \frac{1}{2}(e_i - e_j) \forall i = 3, 6, 9, \ldots, j = 4, 7, 10, \ldots \quad (c)$$

$$\tilde{I}_{C4} = \frac{1}{2}(e_i - e_j) \forall i = 3, 6, 9, \ldots, j = 5, 8, 11, \ldots \quad (d)$$

These calculations result in a signal that primarily is the ringing signal with a very small NMR signal (caused by the $T_2$ decay of the NMR signal between the combined echoes). A reasonable constraint would be that these linear combinations equal zero, or:

$$+e, otl \vec{1} + ee = \tilde{X}\vec{e} = 0 \quad (20)$$

where $$\tilde{X}$$

describes the modified linear combinations. The inclusion of this constraint leads to:

$$\begin{pmatrix} \vec{I} \\ 0 \end{pmatrix} = \begin{pmatrix} X_{SD} \\ \tilde{X} \end{pmatrix} \vec{e} \quad (21)$$

and $$\vec{e}_x = (X^T X + \tilde{X}^T \tilde{X})^{-1} X^T X_{SD} \vec{e} \quad (22)$$

Figure 7:
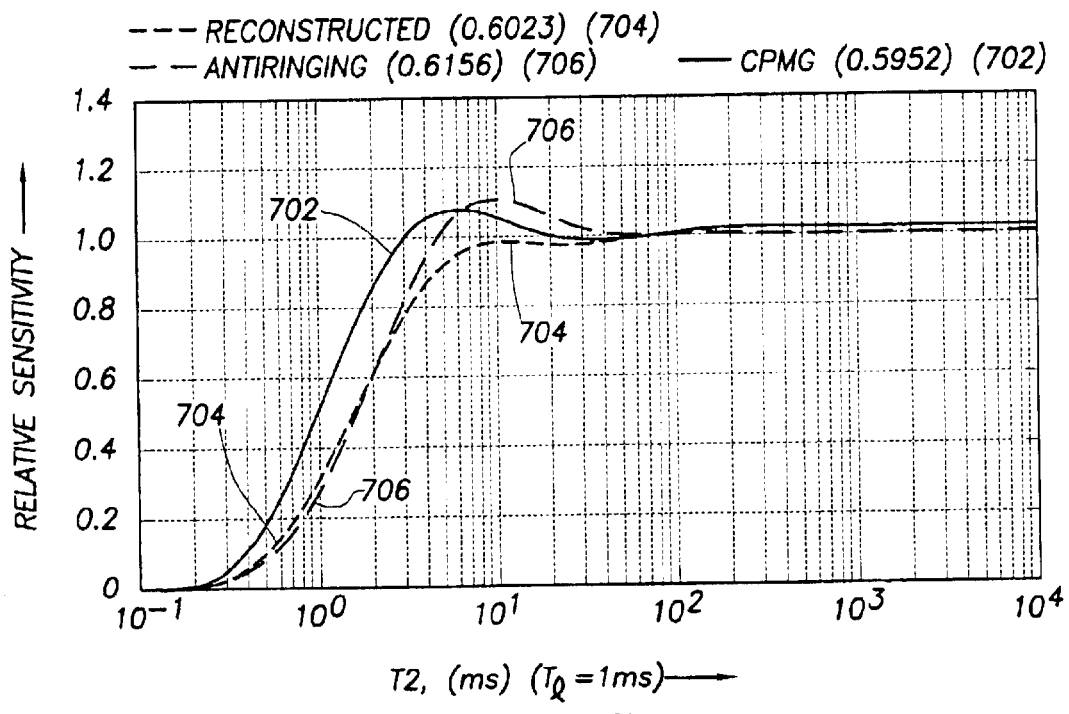
FIG. 7 is a graph comparing sensitivity curves for a porosity estimation derived from a traditional inversion technique using CPMG echoes, a echo reconstruction scheme, and a linear combination processing scheme.

Both the echo reconstruction scheme and the linear combination processing scheme set forth in equations (9)–(22) above have a poorer sensitivity than a traditional inversion computed from CPMG echoes. However, both of the linear combination schemes do have comparable sensitivity responses, indicating that the computation of reconstructed echoes from the linear combinations does not severely affect the inversion algorithm. This can be seen in FIG. 7, which compares the sensitivity of a porosity estimation out of CPMG echoes (curve 702), the echo reconstruction scheme (curve 704), and the linear combination processing scheme (curve 706).

It should be apparent from the foregoing description that many variations of pulse sequences can be used in the described ringing cancellation technique. Further, many variations of linear combinations of echoes within a sequence which reduce the ringing component in the spin echo signal also may be used, as well as different processing methods to derive the desired NMR parameter. Still further, the technique may also be suitable for canceling other noise or spurious components superimposed on the spin echo signal. It should also be understood that the technique is suited for use in both wireline applications and logging while drilling applications, as well as other types of NMR applications in which reduction of spurious signals is a concern.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for reducing a spurious signal in a nuclear magnetic resonance (NMR) measurement, comprising:
   inducing a static magnetic field in a volume to polarize spins of nuclei therein;
   inducing an RF magnetic field in the volume in accordance with a pulse sequence;
   acquiring a sequence of signals, including at least a first signal and a second signal, generated in the volume in response to the pulse sequence, the at least first and second signals in the acquired sequence including a spurious signal component and a spin echo component;
   combining at least the first signal and the second signal of the acquired sequence, the combination generating a corrected signal having a reduced spurious signal component.

2. The method as recited in claim 1, wherein the corrected signal is generated from a linear combination of at least the first signal and the second signal.

3. The method as recited in claim 2, wherein the linear combination is the average of at least the first signal and the second signal.

4. The method as recited in claim 1, wherein the second signal is adjacent the first signal in the acquired sequence.

5. The method as recited in claim 1, wherein the second signal is a next nearest neighbor of the first signal in the acquired sequence.

6. The method as recited in claim 1, wherein a time delay between the first signal and the second signal in the acquired sequence is less than 10 milliseconds.

7. The method as recited in claim 1, wherein a time delay between the first signal and the second signal in the acquired sequence is in the range of 0.5 to 5 milliseconds.

8. The method as recited in claim 1, comprising computing an NMR parameter of the volume using the corrected signal.

9. The method as recited in claim 8, wherein the NMR parameter is a $T_2$ distribution.

10. The method as recited in claim 8, comprising deriving a geological characteristic of the volume based on the computed NMR property.

11. The method as recited in claim 10, wherein the geological characteristic is porosity.

12. The method as recited in claim 1, wherein the pulse sequence comprises a plurality of inversion pulses, and wherein at least one of the inversion pulses is phase alternated relative to the others.

13. The method as recited in claim 1, wherein the pulses of the pulse sequence are arranged to compensate for spin dynamics errors.

14. The method as recited in claim 1, wherein the pulse sequence comprises a plurality of inversion pulses arranged in a repeating phase pattern, and wherein the repeating phase pattern is six inversion pulses arranged to induce a phase pattern of six spin echo signals in accordance with the following:

$$+X_1(-y_1) - X_2(+y_2) - X_3(-y_3) - X_4(=y_4) + X_5(-y_5) + X_6(+y_6)$$

wherein the bold uppercase terms represent direction of the inversion pulses, and the italicized lowercase terms represent direction of the induced spin echo signals in a rotating frame of reference.

15. The method as recited in claim 14, wherein the linear combination is selected from the group consisting of:

$$lc_1=\tfrac{1}{2}(e_i+e_j) \forall i=1, 4, 7, \ldots, j=3, 6, 9, \ldots; \quad (a)$$

$$lc_2=\tfrac{1}{2}(e_i+e_j) \forall i=2, 5, 8, \ldots, j=3, 6, 9, \ldots; \quad (b)$$

$$lc_3=\tfrac{1}{2}(e_i+e_j) \forall i=3, 6, 9, \ldots, j=4, 7, 10, \ldots; \quad (c)$$

$$lc_4=\tfrac{1}{2}(e_i+e_j) \forall i=3, 6, 9, \ldots, j=5, 8, 11, \ldots; \quad (d)$$

wherein lc represents the linear combination, and e represents the induced spin echo signal.

16. The method as recited in claim 1, wherein the pulse sequence comprises a plurality of inversion pulses arranged in a repeating phase pattern, and wherein the repeating phase pattern is three inversion pulses arranged to induce a phase pattern of three spin echo signals in accordance with the following:

$$+Y_1(+y_1)-Y_2(+y_2)-Y_3(+y_3)$$

wherein the bold uppercase terms represent direction of the inversion pulses, and the italicized lowercase terms represent direction of the induced spin echo signals in a rotating frame of reference.

17. The method as recited in claim 1, wherein the pulse sequence comprises a plurality of inversion pulses arranged in a repeating phase pattern, and wherein the repeating phase pattern is three inversion pulses arranged to induce a phase pattern of three spin echo signals in accordance with the following:

$$+Y_1(+y_1)+Y_2(+y_2)-Y_3(+y_3)$$

wherein the bold uppercase terms represent direction of the inversion pulses, and the italicized lowercase terms represent direction of the induced spin echo signals in a rotating frame of reference.

18. The method as recited in claim 1, comprising computing a first reconstructed signal and a second reconstructed signal from the corrected signal, the first and second reconstructed signals representative of the respective spin echo components of the first and second signals of the acquired sequence.

19. The method as recited in claim 1, wherein the first and second signals are closely spaced with each other.

20. A method of reducing a ringing signal generated while measuring a nuclear magnetic resonance (NMR) property of an earth formation adjacent a borehole, comprising:
  inserting a logging tool into the borehole;
  applying a static magnetic field to polarize spins of nuclei within a volume of the earth formation;
  applying an RF magnetic field to the volume in accordance with a pulse sequence comprising a plurality of inversion pulses arranged in a repeating phase pattern;
  acquiring, after each of the plurality of pulses in the pulse sequence, a spin echo signal induced in the volume, the acquistion forming a measurement set comprising a plurality of spin echo signals, each spin echo signal including a spin echo component and a ringing component; and
  combining spin echo signals within the measurement set to reduce the ringing components, the combination generating a corrected measurement set.

21. The method as recited in claim 20, wherein the combining comprises forming a linear combination of spin echo signals within the measurement set.

22. The method as recited in claim 20, comprising determining, from the corrected measurement set, an NMR parameter of the earth formation.

23. The method as recited in claim 22, comprising deriving from the NMR parameter a property of the earth formation.

24. The method as recited in claim 20, wherein the acquiring is performed while drilling the borehole.

25. The method as recited in claim 20, wherein at least one of the inversion pulses in the repeating phase pattern is phase alternated relative to the others.

26. The method as recited in claim 20, wherein the inversion pulses in the repeating phase pattern are arranged to compensate for spin dynamics errors.

27. The method as recited in claim 20, wherein the repeating phase pattern of inversion pulses is six inversion pulses arranged to induce a pattern of six spin echo signals in accordance with the following:

$$+X_1(-y_1)-X_2(+y_2)-X_3(-y_3)-X_4(+y_4)+X_5(-y_5)+X_6(+y_6)$$

wherein the bold uppercase terms represent direction of the inversion pulses, and the italicized lowercase terms represent direction of the induced spin echo signals in a rotating frame of reference.

28. The method as recited in claim 27, wherein the combining comprises forming a linear combination of spin echo signals within the measurement set, and the linear combination is selected from the group consisting of:

$$lc_1=\tfrac{1}{2}(e_i+e_j) \forall i=1, 4, 7, \ldots, j=3, 6, 9, \ldots; \quad (a)$$

$$(b) lc_2=\tfrac{1}{2}(e_i+e_j) \forall i=2, 5, 8, \ldots, j=3, 6, 9, \ldots; \quad (b)$$

$$(c) lc_3=\tfrac{1}{2}(e_i+e_j) \forall i=3, 6, 9, \ldots, j=4, 7, 10, \ldots; \quad (c)$$

$$(d) lc_4=\tfrac{1}{2}(e_i+e_j) \forall i=3, 6, 9, \ldots, j=5, 8, 11, \ldots; \quad (d)$$

wherein lc represents the linear combination, and e represents the induced spin echo signal.

29. The method as recited in claim 20, wherein the repeating phase pattern of inversion pulses is three inversion pulses arranged to induce a pattern of three spin echo signals in accordance with the following:

$$+Y_1(+y_1)-Y_2(+y_2)-Y_3(+y_3)$$

wherein the bold uppercase terms represent direction of the inversion pulses, and wherein the italicized lowercase terms represent direction of the induced spin echo signals in a rotating frame of reference.

30. The method as recited in claim 20, wherein the repeating phase pattern of inversion pulses is three inversion pulses arranged to induce a pattern of three spin echo signals in accordance with the following:

$$+Y_1(+y_1)+Y_2(+y_2)-Y_3(+y_3)$$

wherein the bold uppercase terms represent direction of the inversion pulses, and the italicized lowercase terms represent direction of the induced spin echo signals in a rotating frame of reference.

31. The method as recited in claim 20, comprising computing a set of first reconstructed signals from the corrected measurement set, the set of reconstructed signals representative of the respective spin echo components of the acquired spin echo signals.

32. The method as recited in claim 20, wherein the second signal is adjacent the first signal in the acquired sequence.

33. The method as recited in claim 20, wherein the first and second signals are closely spaced with each other.

34. A method for determining an earth formation property from nuclear magnetic resonance (NMR) measurements, comprising:
  acquiring a first measurement set of spin echo signals induced in the earth formation by a first RF pulse sequence, the spin echo signals including a spin echo component and a noise component;
  linearly combining spin echo signals within the first measurement set to reduce the noise component, the combination generating a first corrected measurement set;
  determining an NMR parameter based on the first corrected measurement set; and
  deriving the earth formation property from the NMR parameter.

35. The method as recited in claim 34, wherein the linearly combining is restricted to only combinations of spin echo signals that reduce the noise component.

36. The method as recited in claim 34, wherein the NMR parameter is a $T_2$ distribution.

37. The method as recited in claim 34, wherein the acquiring is performed while drilling a borehole traversing the earth formation.

38. The method as recited in claim 34, comprising:
  acquiring a second measurement set of spin echo signals induced in the earth formation by a second RF pulse sequence, the second RF pulse sequence being phase alternated relative to the first RF pulse sequence, the spin echo signals of the second measurement set including a spin echo component and a noise component;
  linearly combining spin echo signals within the second measurement set to reduce the noise component, thereby generating a second corrected measurement set,
  combining the first corrected measurment set with the second corrected measurement sets; and
  determining the NMR parameter based on the first and second corrected measurement sets.

39. The method as recited in claim 34, wherein the first RF pulse sequence comprises a plurality of inversion pulses arranged in a repeating phase pattern, and wherein the repeating phase pattern is six inversion pulses arranged to induce a pattern of six spin echo signals in accordance with the following:

$$+X_1(-y_1)-X_2(+y_2)-X_3(-y_3)-X_4(+y_4)+X_5(-y_5)+X_6(+y_6)$$

wherein the bold uppercase terms represent direction of the inversion pulses, and the italicized lowercase terms represent direction of the induced spin echo signals in a rotating frame of reference.

40. The method as recited in claim 39, wherein linearly combining comprises forming at least one linear combination from the group consisting of:

$$lc_1=\tfrac{1}{2}(e_i+e_j)\forall i=1,4,7,\ldots\ j=3,6,9,\ldots; \qquad (a)$$

$$lc_2=\tfrac{1}{2}(e_i+e_j)\forall i=2,5,8,\ldots\ j=3,6,9,\ldots; \qquad (b)$$

$$lc_3=\tfrac{1}{2}(e_i+e_j)\forall i=3,6,9,\ldots\ j=4,7,10,\ldots; \qquad (c)$$

$$lc_4=\tfrac{1}{2}(e_i+e_j)\forall i=3,6,9,\ldots\ j=5,8,11,\ldots; \qquad (d)$$

wherein lc represents the linear combination, and e represents the induced spin echo signal.

41. The method as recited in claim 34, wherein the first RF pulse sequence comprises a plurality of inversion pulses arranged in repeating phase pattern, and wherein the repeating phase pattern is three inversion pulses arranged to induce a pattern of three spin echo signals in accordance with the following:

$$+Y_1(+y_1)-Y_2(+y_2)-Y_3(+y_3)$$

wherein the bold uppercase terms represent direction of the inversion pulses, and the italicized lowercase terms represent direction of the induced spin echo signals in a rotating frame of reference.

42. The method as recited in claim 34, wherein the first RF pulse sequence comprises a plurality of inversion pulses arranged in a repeating phase pattern, and wherein the repeating phase pattern is three inversion pulses arranged to induce a pattern of three spin echo signals in accordance with the following:

$$+Y_1(+y_1)+Y_2(+y_2)-Y_3(+y_3)$$

wherein the bold uppercase terms represent direction of the inversion pulses, and the italicized lowercase terms represent direction of the induced spin echo signals in a rotating frame of reference.

43. The method as recited in claim 34, comprising computing a first reconstructed signal and a second reconstructed signal from the corrected signal, the first and second reconstructed signals representative of the respective spin echo components of the first and second signals of the acquired sequence.

44. The method as recited in claim 34, wherein the second signal is adjacent the first signal in the acquired sequence.

45. The method as recited in claim 34, wherein the first and second signals are closely spaced with each other.

* * * * *